US011741802B2

(12) United States Patent
Farneman et al.

(10) Patent No.: US 11,741,802 B2
(45) Date of Patent: Aug. 29, 2023

(54) HOME SECURITY LIGHT BULB ADAPTER

(71) Applicants: John Otis Farneman, Powell, OH (US); Russell Rossi, Boca Raton, FL (US)

(72) Inventors: John Otis Farneman, Powell, OH (US); Russell Rossi, Boca Raton, FL (US)

( * ) Notice: Subject to any disclaimer, the term of this patent is extended or adjusted under 35 U.S.C. 154(b) by 197 days.

(21) Appl. No.: 17/470,361

(22) Filed: Sep. 9, 2021

(65) Prior Publication Data

US 2021/0407262 A1 Dec. 30, 2021

Related U.S. Application Data

(63) Continuation-in-part of application No. 16/797,368, filed on Feb. 21, 2020, now abandoned, which is a continuation-in-part of application No. 16/233,288, filed on Dec. 27, 2018, now Pat. No. 10,909,823.

(51) Int. Cl.
| | |
|---|---|
| *G08B 13/196* | (2006.01) |
| *G08B 25/10* | (2006.01) |
| *G08B 27/00* | (2006.01) |
| *G08B 7/06* | (2006.01) |
| *F21V 23/04* | (2006.01) |
| *G06V 20/52* | (2022.01) |
| *G06V 40/16* | (2022.01) |
| *F21Y 115/10* | (2016.01) |
| *F21Y 113/17* | (2016.01) |

(52) U.S. Cl.
CPC ........ *G08B 13/196* (2013.01); *F21V 23/0464* (2013.01); *F21V 23/0471* (2013.01); *G06V 20/52* (2022.01); *G06V 40/165* (2022.01); *G06V 40/171* (2022.01); *G06V 40/172* (2022.01); *G08B 7/066* (2013.01); *G08B 25/10* (2013.01); *G08B 27/001* (2013.01); *F21Y 2113/17* (2016.08); *F21Y 2115/10* (2016.08)

(58) Field of Classification Search
None
See application file for complete search history.

(56) References Cited

U.S. PATENT DOCUMENTS

| | | | | |
|---|---|---|---|---|
| 8,179,255 B1* | 5/2012 | Lamore | .............. | G08B 13/1436 340/541 |
| 8,267,361 B1* | 9/2012 | Dordick | ................. | F16M 11/14 396/419 |
| 8,562,158 B2* | 10/2013 | Chien | .................. | H05B 47/175 362/276 |

(Continued)

*Primary Examiner* — Fekadeselassie Girma
(74) *Attorney, Agent, or Firm* — Thomas Y. Kendrick; Benjamen E. Kern; Kern Kendrick, LLC

(57) ABSTRACT

An electrically powered home security pathway fixture includes a head unit and a spike at a top end and a bottom end of an elongated body, respectively. An integrated camera configured to recognize an approaching object according to features stored in a database; a motion sensor coupled to the integrated camera and a light emitter for illumination which is activated by either: the motion sensor or detected ambient light level being below a threshold. A wireless communications interface configured to send video signals captured by the camera directly to a remote device via the wireless communications interface, after the server/database confirming that the recognized features of the approaching object is not on an approved list.

20 Claims, 11 Drawing Sheets

(56) References Cited

U.S. PATENT DOCUMENTS

| | | | |
|---|---|---|---|
| 9,021,044 B2* | 4/2015 | Blustein | H04L 12/2818 709/208 |
| 9,053,622 B2* | 6/2015 | Scalisi | H05B 47/19 |
| 9,165,444 B2* | 10/2015 | Scalisi | H04N 7/188 |
| 9,228,731 B2* | 1/2016 | Chen | G08B 13/19617 |
| 9,519,203 B1* | 12/2016 | Kennair, Jr. | G03B 17/566 |
| 9,769,420 B1* | 9/2017 | Moses | H04N 7/147 |
| 9,784,417 B1* | 10/2017 | Springer | F21V 23/006 |
| D811,463 S * | 2/2018 | Kim | D16/203 |
| 10,023,277 B1* | 7/2018 | Oberholtzer | B63B 21/26 |
| 10,225,522 B1* | 3/2019 | Kusens | H04N 23/60 |
| 10,271,019 B1* | 4/2019 | Berg | H04N 23/57 |
| 10,706,696 B1* | 7/2020 | Pachikov | G08B 13/196 |
| 10,769,909 B1* | 9/2020 | Modestine | G06V 20/52 |
| 2003/0197807 A1* | 10/2003 | Wu | G08B 13/19634 348/E5.029 |
| 2006/0106504 A1* | 5/2006 | Carpenter | G08G 1/14 701/1 |
| 2008/0062258 A1* | 3/2008 | Bentkovski | H04N 21/2187 348/E7.086 |
| 2008/0123354 A1* | 5/2008 | Caldani | F21V 21/22 362/418 |
| 2009/0015396 A1* | 1/2009 | Yeh | H04B 3/54 340/538.17 |
| 2012/0147585 A1* | 6/2012 | Girouard | F21V 21/22 362/84 |
| 2012/0150598 A1* | 6/2012 | Griggs | G06Q 20/384 705/14.16 |
| 2012/0239773 A1* | 9/2012 | Blustein | H04L 12/2838 709/208 |
| 2012/0321192 A1* | 12/2012 | Marshall | H04L 51/52 382/190 |
| 2012/0321221 A1* | 12/2012 | Marshall | G06Q 50/01 709/217 |
| 2013/0050495 A1* | 2/2013 | Chen | G08B 13/19617 348/151 |
| 2014/0263249 A1* | 9/2014 | Miller | B23K 9/32 219/137.31 |
| 2015/0070897 A1* | 3/2015 | Chien | F21V 14/02 362/269 |
| 2015/0144372 A1* | 5/2015 | Grant | F21V 21/22 174/68.3 |
| 2015/0168554 A1* | 6/2015 | Aharoni | G01S 7/52046 250/493.1 |
| 2016/0100086 A1* | 4/2016 | Chien | G08B 13/19636 348/143 |
| 2016/0116144 A1* | 4/2016 | Grant | F21V 21/36 362/418 |
| 2016/0134846 A1* | 5/2016 | Miller | G08B 13/1966 348/151 |
| 2016/0215962 A1* | 7/2016 | Chien | F21V 23/0442 |
| 2016/0255697 A1* | 9/2016 | Bhide | F21V 23/0442 315/161 |
| 2016/0290377 A1* | 10/2016 | Ng | F21S 6/002 |
| 2017/0124823 A1* | 5/2017 | Smith | G08B 13/19695 |
| 2017/0244934 A1* | 8/2017 | Chien | H04N 7/183 |
| 2017/0321850 A1* | 11/2017 | Chien | F21K 9/60 |
| 2018/0013986 A1* | 1/2018 | Chien | F21V 29/00 |
| 2018/0033273 A1* | 2/2018 | Siminoff | H04N 5/76 |
| 2018/0035084 A1* | 2/2018 | Swiss | H04N 7/185 |
| 2018/0122220 A1* | 5/2018 | Billig | G08B 25/10 |
| 2018/0191931 A1* | 7/2018 | Bly | H04N 23/54 |
| 2018/0249054 A1* | 8/2018 | Chien | F21V 23/0464 |
| 2018/0283666 A1* | 10/2018 | Beausoleil | E04H 17/20 |
| 2018/0332204 A1* | 11/2018 | Chien | H04N 7/186 |
| 2019/0011818 A1* | 1/2019 | Chien | G03B 21/20 |
| 2019/0087646 A1* | 3/2019 | Goulden | H04M 11/02 |
| 2019/0208765 A1* | 7/2019 | D'Acquisto | F41H 3/00 |
| 2019/0230324 A1* | 7/2019 | Chien | F21K 9/232 |
| 2019/0246019 A1* | 8/2019 | Tian | H04N 23/90 |
| 2019/0246074 A1* | 8/2019 | Sebree | H04N 23/51 |
| 2019/0253670 A1* | 8/2019 | Chien | F21S 4/28 |
| 2019/0279485 A1* | 9/2019 | VanBlon | H04L 63/107 |
| 2019/0310535 A1* | 10/2019 | Kenny | F16M 11/125 |
| 2019/0311201 A1* | 10/2019 | Selinger | G08B 25/006 |
| 2019/0360671 A1* | 11/2019 | Gall | F16M 11/041 |
| 2019/0364244 A1* | 11/2019 | Siminoff | G08B 27/003 |
| 2019/0385373 A1* | 12/2019 | Mittleman | G08B 29/18 |
| 2020/0296328 A1* | 9/2020 | Siminoff | H04N 7/186 |
| 2021/0407262 A1* | 12/2021 | Farneman | G08B 25/10 |

* cited by examiner

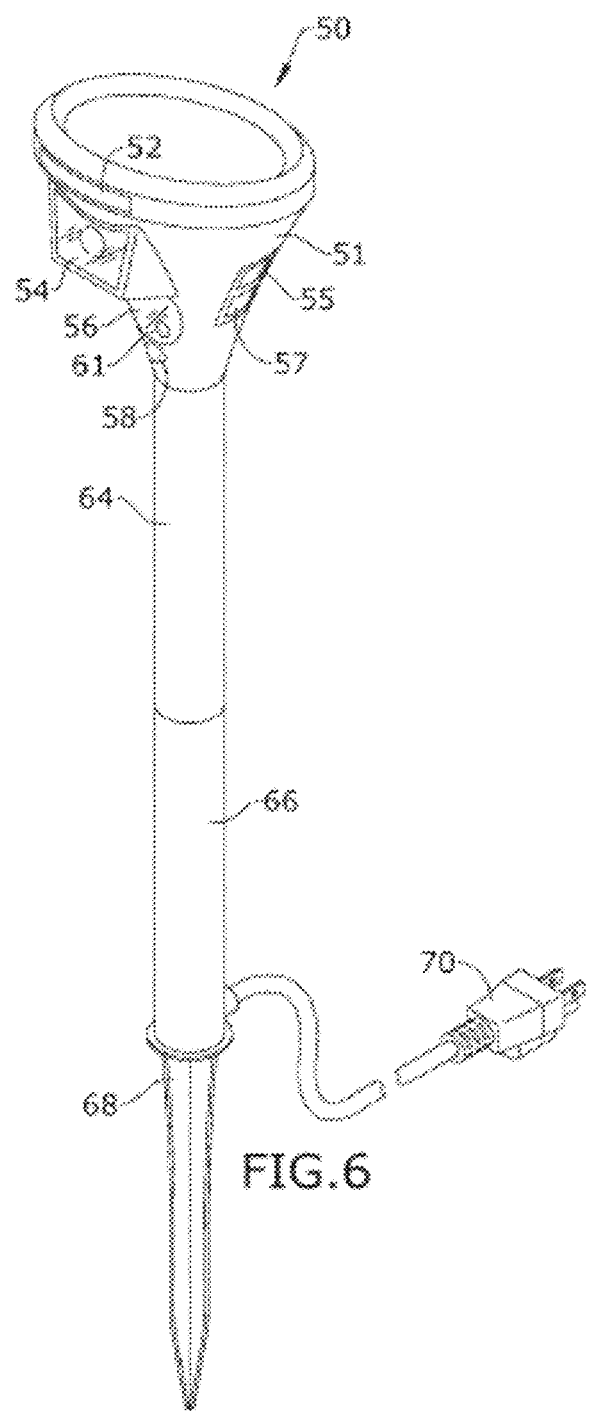
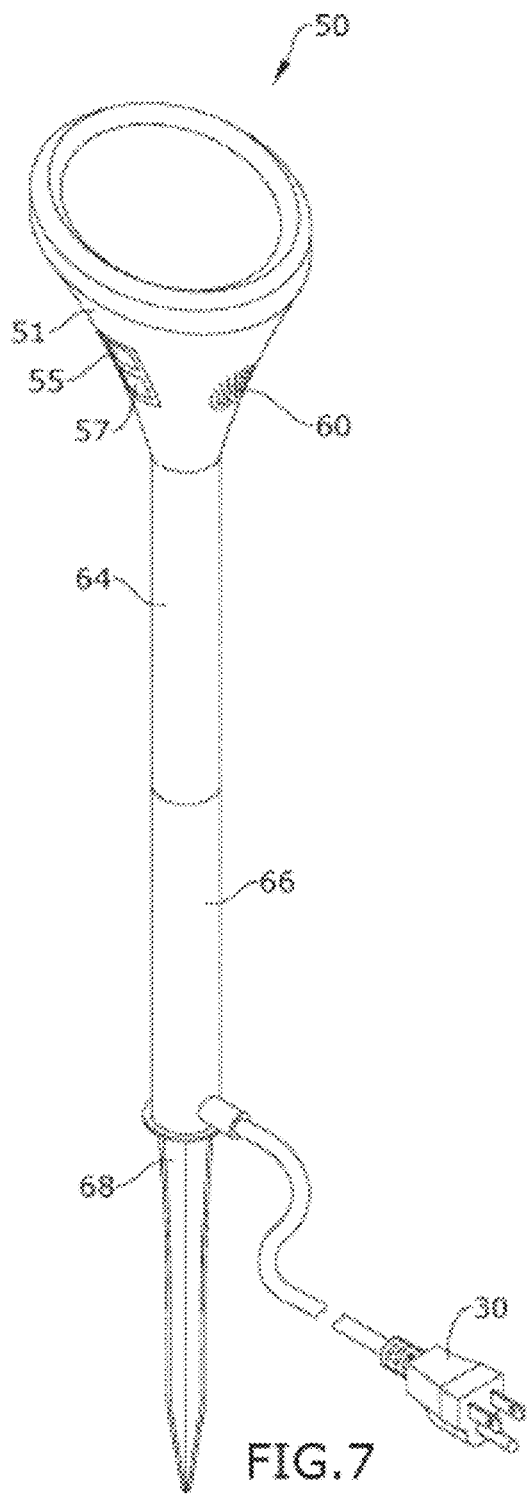

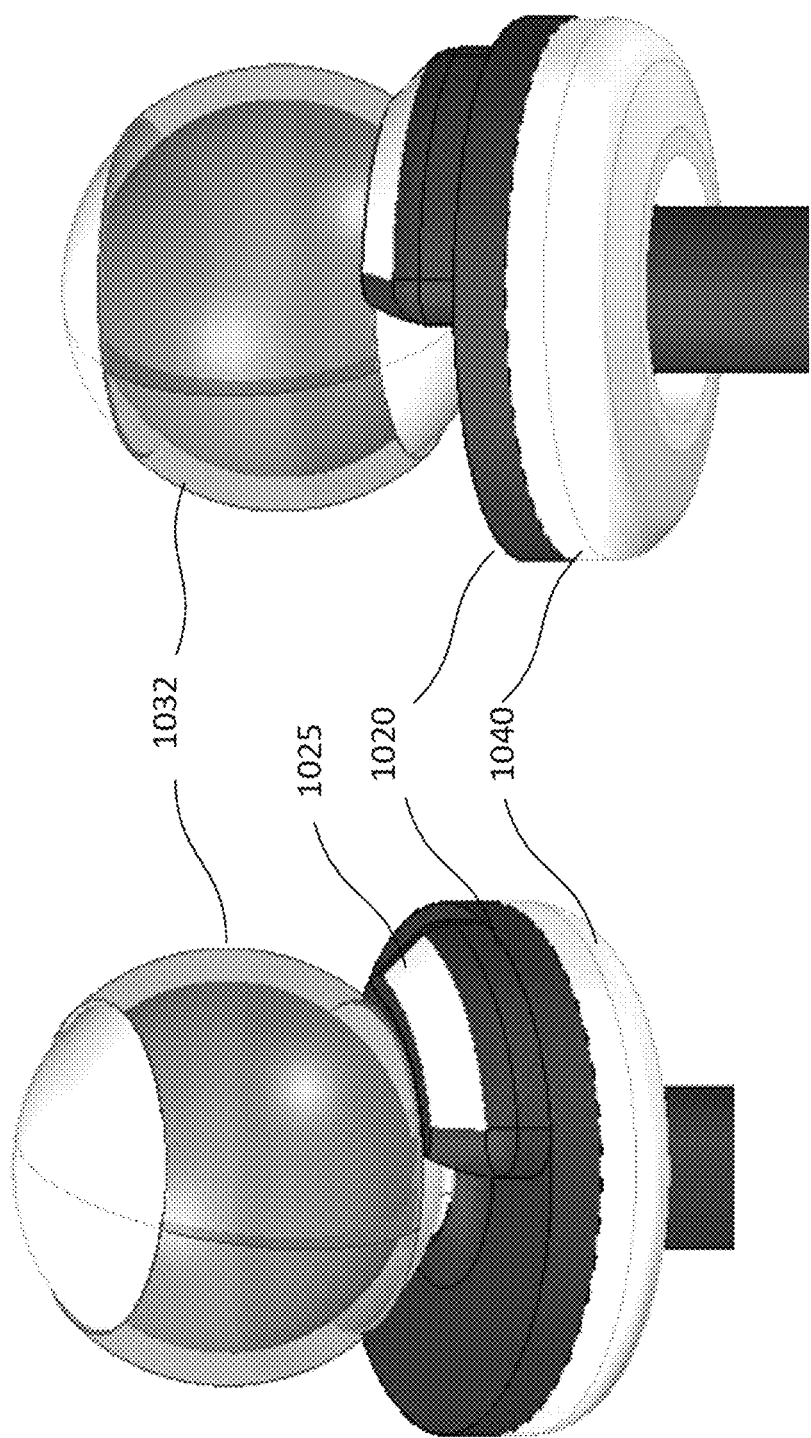

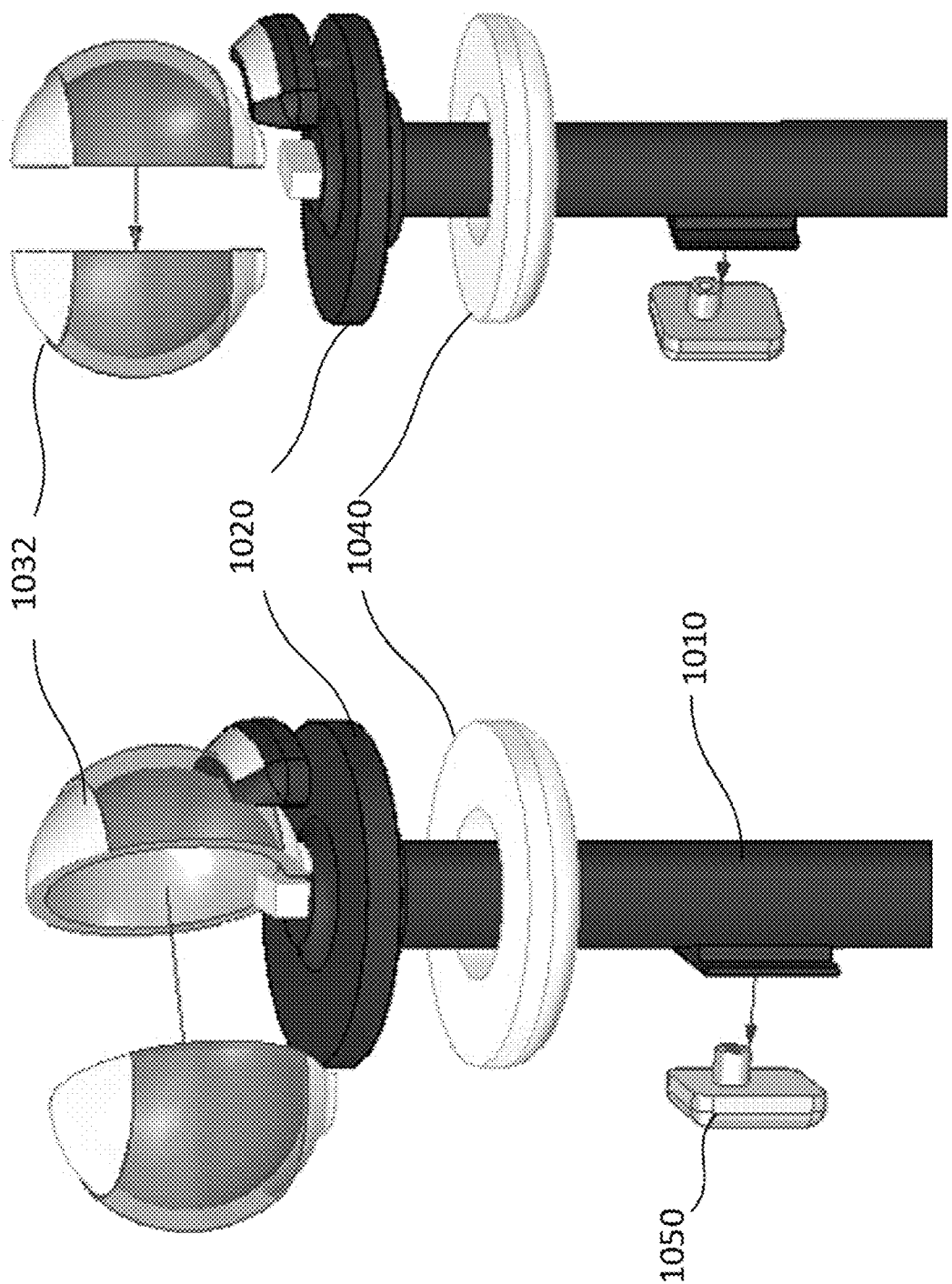

HOME SECURITY LIGHT BULB ADAPTER

CROSS REFERENCE TO RELATED APPLICATIONS

This application is a Continuation-In-Part application of U.S. application Ser. No. 16/797,368, titled "Home Security Light Bulb Adapter," filed on Feb. 21, 2020, which is a Continuation-In-Part application of U.S. application Ser. No. 16/233,288, titled "Home Security Light Bulb Adapter," filed on Dec. 27, 2018, which issued as U.S. Pat. No. 10,909,823 on Feb. 2, 2021, the contents of each of which are herein incorporated by reference in their entireties.

TECHNICAL FIELD

The present application relates to a home security light bulb adapter and a home security pathway fixture mounted at ground level.

BACKGROUND

The present disclosure relates to a home security system and more particularly to home security light fixtures.

Currently, to install security cameras and incorporate a light fixture with the camera, the user must replace the existing fixture. An entire replacement can be expensive and time consuming. Further, replacing the fixture yourself can be very dangerous and often times the consumer hires a professional for proper installation.

Landscape lighting or garden lighting is used for outdoor illumination of private gardens and public landscapes. Current pathway lights are secured to the ground and include a motion sensor and a light emitter. The pathway lights provide light to a walkway but do not include any additional features.

As can be seen, there is a need for improved pathway lights to provide home security.

SUMMARY

In one aspect of the present disclosure (see FIGS. 10A-H), a home security pathway fixture 1000 may include: an elongated body 1010; a head unit 1030 at a top end A of the elongated body. At a bottom end B of the elongated body is located a power source 1060. The head unit 1030 at the top end of the elongated body further includes: an integrated camera 1032 which is electrically connected to the power source 1060, wherein the integrated camera 1032 is configured to capture an image and to recognize an approaching object according to features stored in a server/database 1072. A motion sensor is coupled to the integrated camera and electrically connected to the power source, the motion sensor may be configured to sense a motion of the approaching object. A light emitter 1020 is coupled to the head unit 1030 and electrically connected to the power source for illumination, wherein the light emitter 1020 is activated by one or a combination of: the motion sensor that detects motion and whether the detected average ambient light being below a defined threshold. A wireless communications interface 1050 (e.g., Bluetooth or WiFi protocol) is electrically connected to the power source; and a processor 1080 is electrically connected to the power source 1060 to control the integrated camera 1032, the motion sensor, the light emitter 1020 (high intensity light for night mode, and multiple color tone), and the wireless communications interface 1050. When the motion sensor senses a motion of the approaching object, the integrated camera 1032 is activated and the processor sends video signals captured by the camera directly to a remote device 72 via the wireless communications interface 1050 for monitoring, that is after the server/database 1072 having confirmed that the recognized features of the approaching object is not on an approved list or is an unfriendly subject.

In another aspect of the present disclosure, a method for monitoring a property using a security pathway fixture 1000 disposed at ground level along a pathway to a property includes the steps of: determining according to captured images of the approaching object by an integrated camera 1032 which is mounted on a top end of a head unit 1030 of the security pathway fixture 1000. The integrated camera 1032 is configured to recognize the approaching object according to features stored in a server/database 1072 which is locally or remotely located. Detecting, by a motion sensor that is coupled to the integrated camera 1032, whether an approaching object should be alerted for security actions; activating, a light emitter 1020 to illuminate the approaching object, according to one or a combination of: a detected motion of the approaching object and whether a detected average ambient light being below a defined threshold. The captured image of the approaching object is determined using a facial recognition algorithm, whether in an approved list or not. The facial recognition determination includes comparing through the server/database 1072, recognized features of the approaching object on the captured image being on the approved list in the server/database 1072, wherein the facial recognition algorithm is executed by a processor 1080 locally at the security pathway fixture or remotely at the server/database 1072. The result of the facial recognition is sent by a wireless communications interface 1050, along with the captured image or a video in real time of the approaching object directly to a remote device 72 for monitoring and for subsequent security measures.

These and other features, aspects and advantages of the present disclosure will become better understood with reference to the following drawings, description and claims.

BRIEF DESCRIPTION OF THE DRAWINGS

FIG. 6 is a front perspective view of an embodiment of the present disclosure;

FIG. 7 is a rear perspective view of an embodiment of the present disclosure;

FIG. 10B is a perspective view of another embodiment of the present disclosure;

FIG. 10C is a perspective view of another embodiment of the present disclosure;

FIG. 10G is an exploded view of the head unit of another embodiment of the present disclosure;

FIG. 10H is an exploded view of the head unit of another embodiment of the present disclosure;

DESCRIPTION OF EMBODIMENTS

Figure 1:
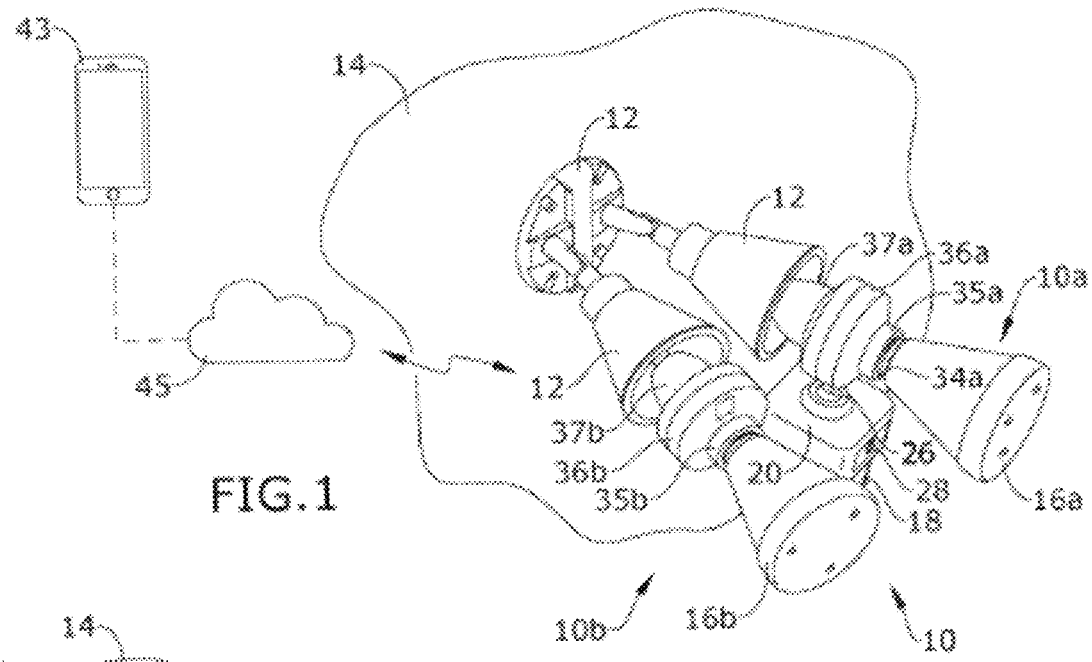
FIG. 1 is a perspective view of an embodiment of the present disclosure.
Figure 2:
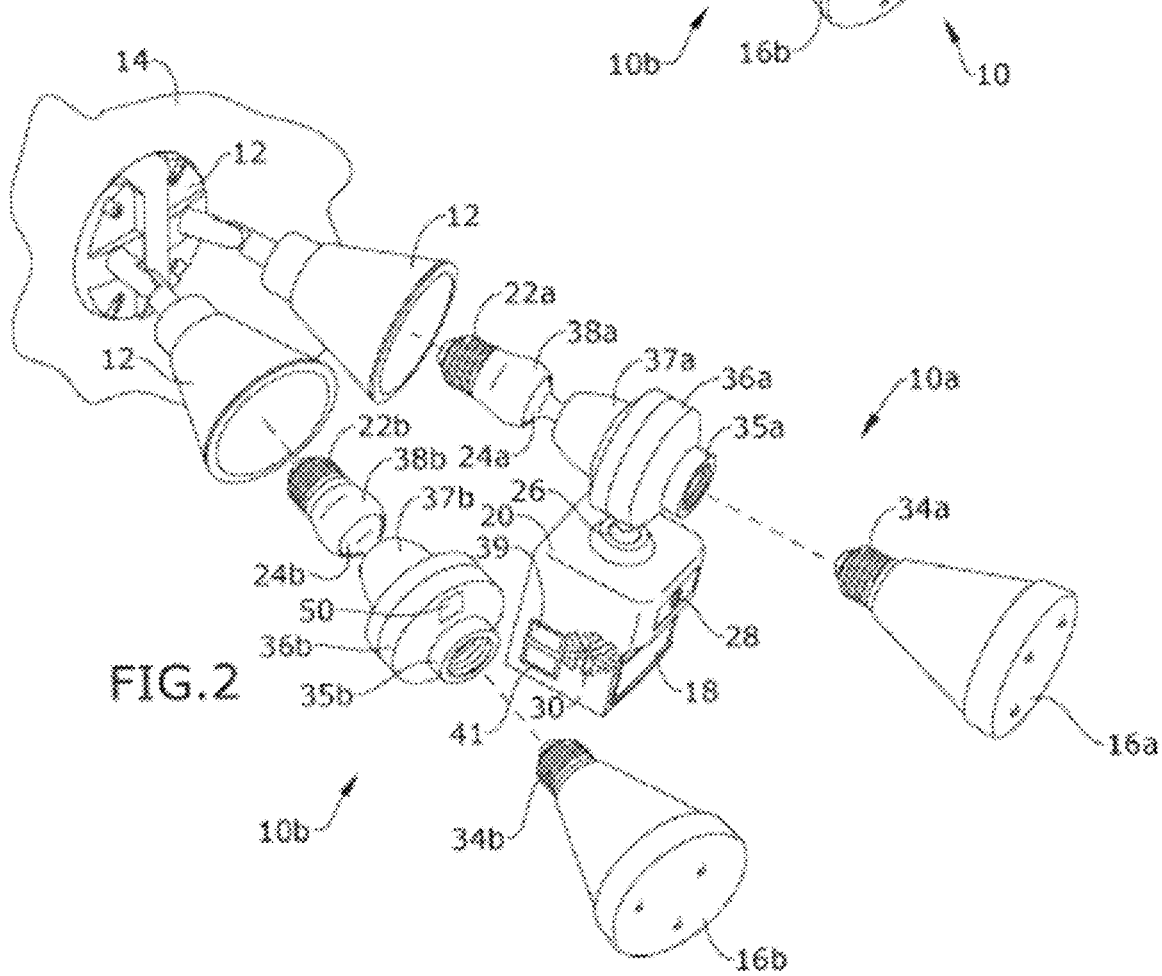
FIG. 2 is an exploded view of an embodiment of the present disclosure.
Figure 3:
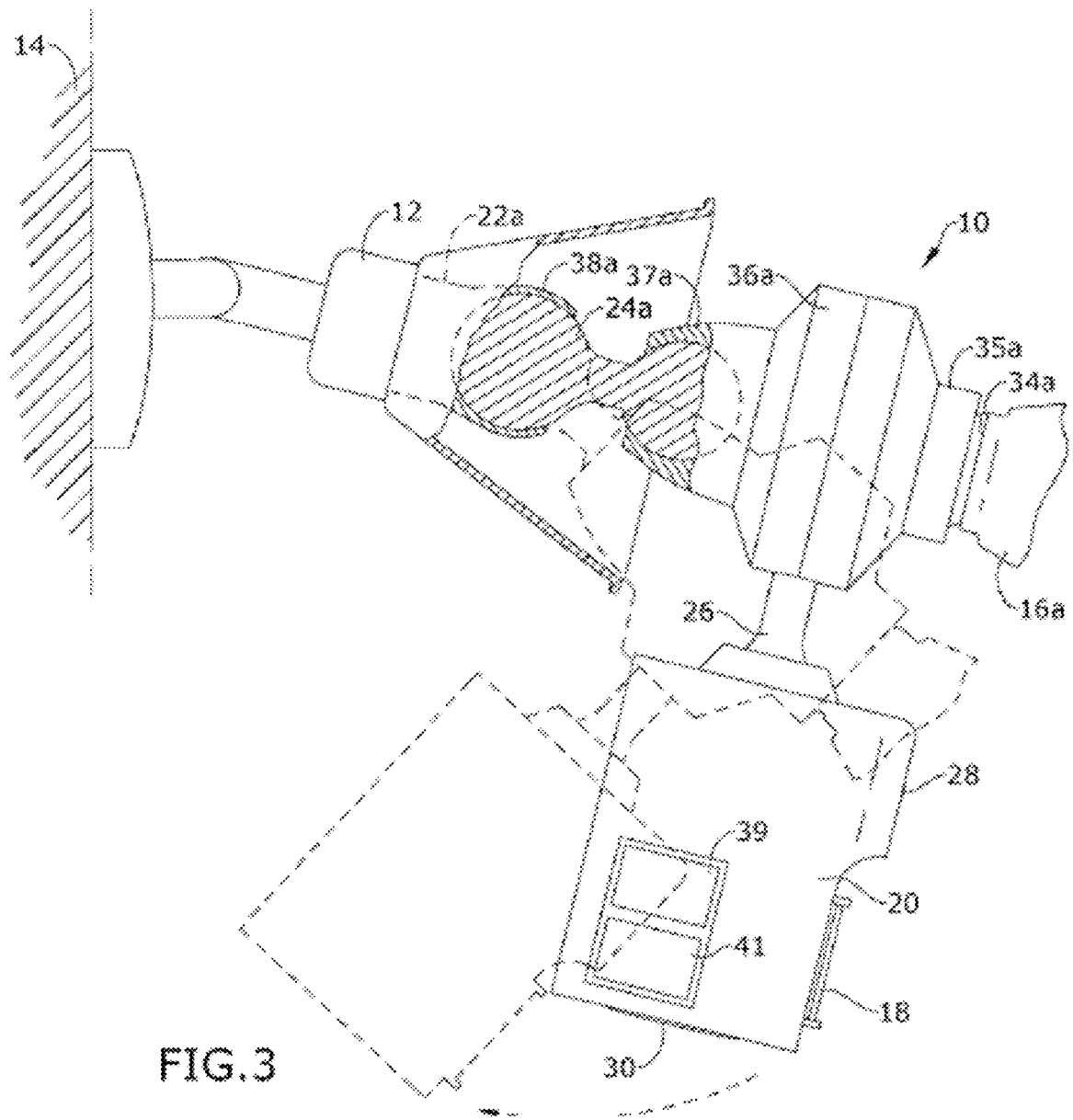
FIG. 3 is a side view of an embodiment of the present disclosure.
Figure 4:
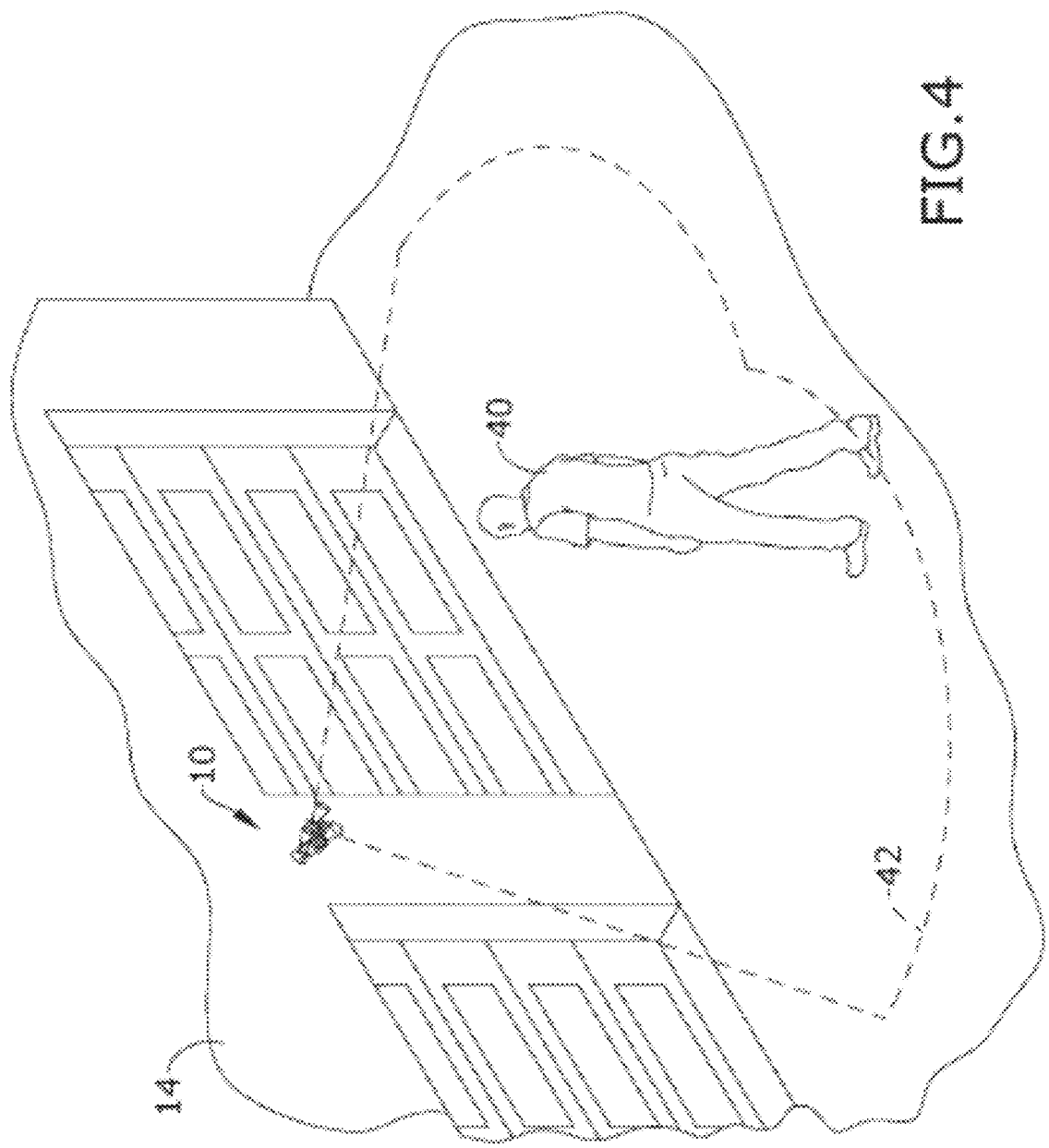
FIG. 4 is a perspective view of an embodiment of the present disclosure.
Figure 5:
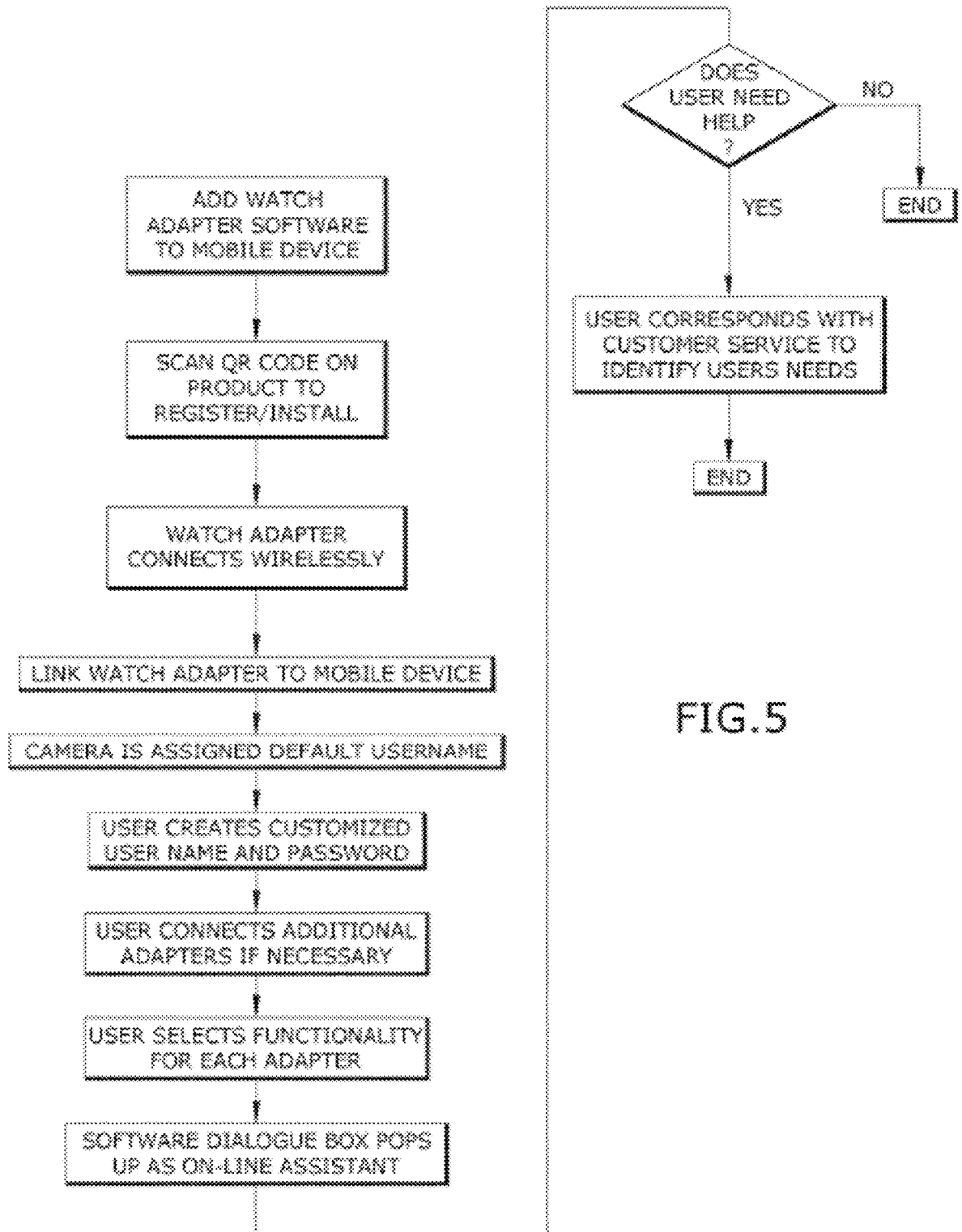
FIG. 5 is a flow chart of an embodiment of the present disclosure.
Figure 8:
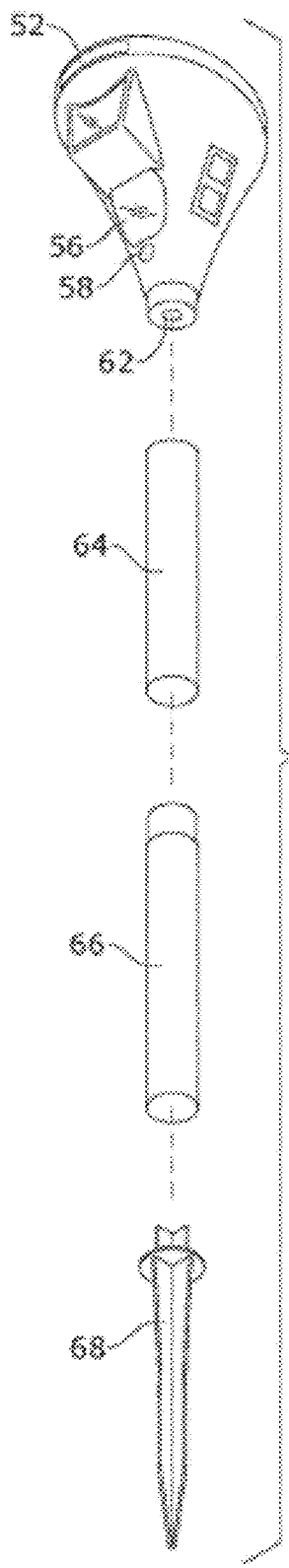
FIG. 8 is an exploded view of an embodiment of the present disclosure.
Figure 9:
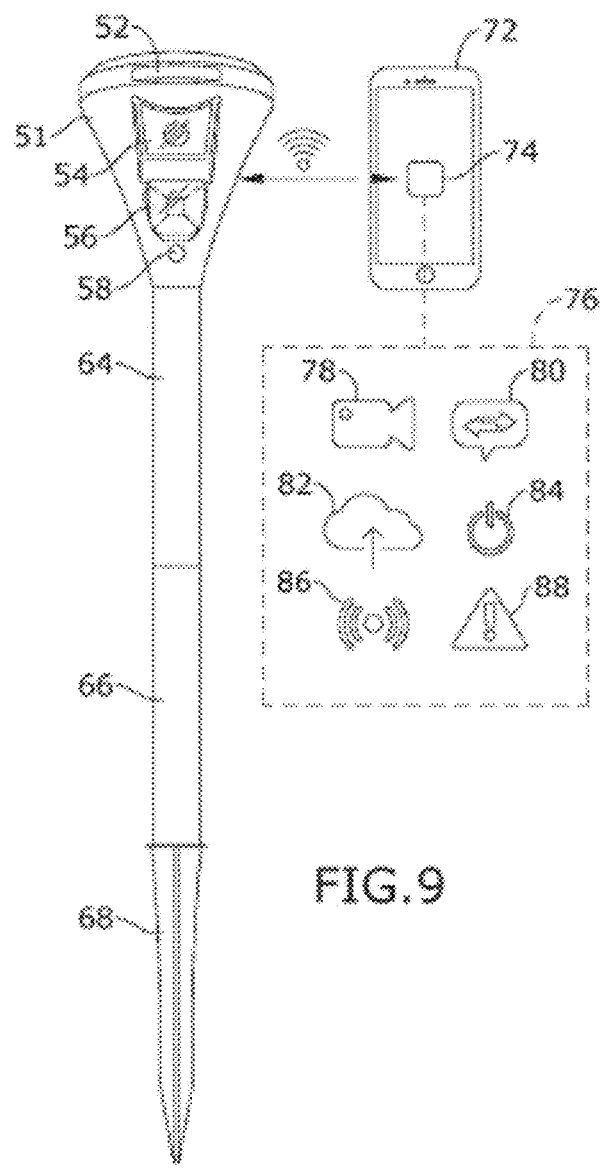
FIG. 9 is a schematic view of an embodiment of the present disclosure.

The disclosure is better understood with reference to the following drawings and description. The elements in the figures are not necessarily to scale, emphasis instead being placed upon illustrating the principles of the disclosure. Moreover, in the figures, like-referenced numerals may designate to corresponding parts throughout the different views.

The following detailed description is of the best currently contemplated modes of carrying out exemplary embodiments of the disclosure. The description is not to be taken in a limiting sense, but is made merely for the purpose of illustrating the general principles of the disclosure, since the scope of the disclosure is best defined by the appended claims.

Referring to FIG. 1 through 5, the present disclosure includes a home security light bulb adapter 10. The home security light bulb adapter 10 may include a primary adapter 10a and a secondary adapter 10b. The primary adapter 10a includes a bulb connector 22a having male threads. The primary adapter 10a further includes a bulb socket 35a having female threads. The bulb socket 35a is electrically connected to the bulb connector 22a. A camera 28 and sensors 18 are electrically connected to the bulb connector 22a. The camera 28 may have night vision capabilities. The adapter 10 further includes a wireless communications interface 39 and a processor 41 electrically connected to the bulb connector 22a. When the bulb connector 22a is connected to a bulb fixture 12 of a wall 14, the camera 28 and the bulb socket 35a are switched on when the sensors 18 sense a motion. The processor 41 then sends video signals to a remote device 43 over a network 45 via the wireless communications interface 39.

The remote device 43 of the present disclosure may be a laptop, desktop, or a smart device, such as a smart phone or a tablet with a computing system. The computing system is at least a processor and a memory. The computing system may execute on any suitable operating system such as IBM's zSeries/Operating System (z/OS), MS-DOS, PCDOS, MAC-iOS, WINDOWS, UNIX, OpenVMS, ANDROID, an operating system based on LINUX, or any other appropriate operating system, including future operating systems.

In particular embodiments, the computing system includes a processor, memory, a user interface, and a communication interface. In particular embodiments, the processor includes hardware for executing instructions, such as those making up a computer program. The memory includes main memory for storing instructions such as computer program(s) for the processor to execute, or data for processor to operate on. The memory may include an HDD, a Secure Digital (SD), a floppy disk drive, flash memory, an optical disc, a magneto-optical disc, magnetic tape, a Universal Serial Bus (USB) drive, a solid-state drive (SSD), or a combination of two or more of these. The memory may include removable or non-removable (or fixed) media, where appropriate. The memory may be internal or external to computing system, where appropriate. In particular embodiments, the memory is non-volatile, solid-state memory.

The user interface includes hardware, software, or both providing one or more interfaces for user communication with the computing system. As an example and not by way of limitation, the user interface may include a keyboard, keypad, microphone, monitor, mouse, printer, scanner, speaker, still camera, stylus, tablet, touchscreen, trackball, video camera, another user interface or a combination of two or more of these.

The communication interface 39 of the computing system and the adapter 10 include hardware, software, or both providing one or more interfaces for communication (e.g., packet-based communication) between the adapter 10 and one or more other computing systems or one or more networks 45. As an example and not by way of limitation, communication interface may include a network interface controller (NIC) or network adapter for communicating with an Ethernet or other wire-based network or a wireless NIC (WNIC) or wireless adapter for communicating with a wireless network 45, such as a WI-FI network. This disclosure contemplates any suitable network and any suitable communication interface. As an example and not by way of limitation, the adapter 10 and computing system may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computing system may communicate with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these. The adapter 10 and computing system may include any suitable communication interface for any of these networks, where appropriate.

In certain embodiments, the primary adapter 10a of the present disclosure includes a housing 20. The housing 20 may include a circuit board. The processor 39 the communications interface 41, the sensors 18, and the camera 28 may be disposed within the housing 20 and may be electrically connected to the circuit board. The primary adapter 10a may further include an electrical joint housing 36a electrically connecting the housing 20, the bulb connector 22a, and the bulb socket 35a.

In certain embodiments, the bulb connector 22a is coupled to the electrical joint housing 36a by a first ball joint 24a. For example, the first ball joint 24a is disposed within a first socket 38a of the bulb connector 22a and a second socket 37a of the electrical joint housing 36a. The first ball joint 24a allows the electrical joint housing 36a to be moveable along an x axis and y axis relative to the bulb connector 22a. In certain embodiments, the housing 20 is coupled to the electrical joint housing 36a by a second ball joint 26, allowing the housing 20 to rotate along an axis relative to the electrical joint housing 36a. The first and second ball joint connections allow a user to position the sensors 18 and camera 28 to point to a desired location relative to the bulb fixture 12.

The primary adapter 10a of the present disclosure may further include a speaker and a microphone 30. The speaker and microphone 30 are coupled to the housing 20, electrically coupled to the circuit board, and thereby electrically connected to the bulb connector 22a. In such embodiments, the microphone 30 is also switched on when the sensors 28 senses a motion.

In certain embodiments, the remote device 43 receives video signals from the primary adapter 10a and also sends commands to the primary adapter 10a. In such embodiments, a software may be loaded on the memory of the remote device 43. For example, an application may be loaded on a smart phone. Once the application is loaded on a smart phone, the primary adapter(s) 10a are registered. The primary adapter 10a is then connected to a wireless network 45 and the remote device 43 may now wirelessly communicate with the primary adapter 10a over the network 45. The remote device 43 may wirelessly communicate with the processor 41 of the primary adapter 10a via the wireless communications interface 39 to turn the sensors on and off. Further, the remote device 43 may be used to adjust the proximity range 42 of the sensors 18.

When the sensors 18 are turned on and thereby activated, the camera 28, the speaker and microphone 30, and the bulb socket 35a are switched on when the sensors 18 sense a motion by a potential intruder 40 within a proximity range 42 of the sensors 18. If a light bulb 16a is attached to the bulb socket 35, the light bulb 16a turns on. An alert is sent to the remote device 43, indicating that the motion sensors 18 has sensed the motion. The video and sound signals are also sent to the remote device 43, such as a live feed of the camera 28 and a live feed of the speaker and microphone 30. In certain embodiments, the remote device 43 wirelessly communicates with the processor 41 via the wireless communications interface 39 to control an output of the speaker 30 for a two-way remote communication. A user initiates a button on the remote device 43 and begins to speak. An audio signal is sent to the primary adapter 10a via the communications interface 39 and a live feed of the user's audio is produced by the speaker 30. For example, the user may remotely instruct the intruder 40 to leave the property. Additionally, the user may initiate a siren to play on the speaker 30 of the adapter 10 to scare the intruder 40 away. Moreover, the adapter 10 enables the user to access the lighting fixture's 12 functions remotely-turning the light function on and off, setting a timer, using as an every-day light, and two-way communication all through the wireless communications interface 39.

In certain embodiments, the present disclosure may include a secondary adapter 10b. The secondary adapter 10b includes a bulb connector 22b having male threads. The secondary adapter 10b further includes a bulb socket 35b having female threads. The bulb socket 35b is electrically connected to the bulb connector 22b. An electrical joint housing 36b electrically connects, the bulb connector 22b and the bulb socket 35b. The secondary adapter 10b further includes a wireless communications interface 50 disposed within the electrical joint housing 36b that is electrically connected to the bulb connector 22b. When the bulb connector 22b is connected to a bulb fixture 12 of a wall 14, the wireless communications interface 50 and the bulb socket 35b are powered.

Similar to the primary adapter 10a, a first ball joint 24b is disposed within a first socket 38b of the bulb connector 22b and a second socket 37b of the electrical joint housing 36b. The first ball joint 24b allows the electrical joint housing 36b to be moveable along an x axis and y axis relative to the bulb connector 22b.

The wireless communications interface 50 may include an RFID chip. The wireless communications interface 50 syncs with the wireless communications interface 39 of the primary adapter 10a. In such embodiments, when the sensors 18 of the primary adapter 10 sense a motion, the light bulb 16b coupled to the bulb socket 35b of the secondary adapter 10b turns on simultaneously with the light bulb 16a coupled to the bulb socket 35a of the primary adapter 10a.

Referring to FIGS. 6 through 9, the present disclosure includes a home security pathway fixture 50. The home security pathway fixture 50 includes an elongated body 64, 66 having a top end and a bottom end. A spike 68 is protruding from the bottom end and a head unit 51 is disposed at the top end. The head unit 51 includes at least a light emitter 56. The home security pathway fixture 50 further includes a camera 54 with night vision 52, a motion sensor 58, a wireless communications interface 55, and a processor 57. The camera 54 is switched on when the motion sensor 58 senses a motion. The processor 57 then sends video signals to a remote device 72 over a network 59 via the wireless communications interface 55.

The present disclosure may further include a dusk and dawn sensor 61 integrated with the light emitter 56. The dusk and sawn sensor 61 detects light. If the motion sensor 58 detects motion and the dusk and dawn sensor 61 detects light, the camera 54 is only activated and the light emitter 56 is not activated. If the motion sensor 58 detects motion and the dusk and dawn sensor 61 does not detect light, then both the camera 54 and the light emitter 56 are activated. The remote device 72 of the present disclosure may be a laptop, desktop, or a smart device, such as a smart phone or a tablet with a computing system. The computing system is at least a processor and a memory. The computing system may execute on any suitable operating system such as IBM's zSeries/Operating System (z/OS), MS-DOS, PC-DOS, MAC-iOS, WINDOWS, UNIX, OpenVMS, ANDROID, an operating system based on LINUX, or any other appropriate operating system, including future operating systems.

In particular embodiments, the computing system includes a processor, memory, a user interface, and a communication interface. In particular embodiments, the processor includes hardware for executing instructions, such as those making up a computer program. The memory includes main memory for storing instructions such as computer program(s) for the processor to execute, or data for processor to operate on. The memory may include an HDD, a Secure Digital (SD), a floppy disk drive, flash memory, an optical disc, a magneto-optical disc, magnetic tape, a Universal Serial Bus (USB) drive, a solid-state drive (SSD), or a combination of two or more of these. The memory may include removable or non-removable (or fixed) media, where appropriate. The memory may be internal or external to computing system, where appropriate. In particular embodiments, the memory is non-volatile, solid-state memory.

The user interface includes hardware, software, or both providing one or more interfaces for user communication with the computing system. As an example and not by way of limitation, the user interface may include a keyboard, keypad, microphone, monitor, mouse, printer, scanner, speaker, still camera, stylus, tablet, touchscreen, trackball, video camera, another user interface or a combination of two or more of these.

The communication interfaces of the computing system and the home security pathway fixture 50 includes hardware, software, or both providing one or more interfaces for communication (e.g., packet-based communication)

between the home security pathway fixture 50 and one or more other computing systems or one or more networks 59. As an example and not by way of limitation, communication interface may include a network interface controller (NIC) or network adapter for communicating with an Ethernet or other wire-based network or a wireless NIC (WNIC) or wireless adapter for communicating with a wireless network 59, such as a WI-FI network. This disclosure contemplates any suitable network and any suitable communication interface. As an example and not by way of limitation, the home security pathway fixture 50 and computing system may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computing system may communicate with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these. The home security pathway fixture 50 and computing system may include any suitable communication interface for any of these networks, where appropriate.

In certain embodiments, the head unit 51 is a housing. The housing may include a circuit board disposed therein. The processor 57, the communications interface 55, the motion sensor 58, and the camera 54 may be electrically connected to the circuit board. The circuit board may be electrical connected to a power source. The power source may include a power cord 70 configured to connect with an outlet. Alternatively, the power source may include a battery or a rechargeable battery.

The spike 68 allows the present disclosure to be used as a pathway light fixture. The spike 68 of the present disclosure is driven into the ground and supports the elongated body 64, 66 in an upright position. The elongated body 64, 66 may include an upper member 64 and a lower member 66. The spike 68 may be releasably couple to the lower member 66, the lower member 66 may releasably couple to the upper member 64 and the upper member 64 may releasably couple to the head unit 51. A power switch 62 may be disposed at the bottom of the head unit 62 and may be hidden in the upper member 64 when the head unit 62 is releasably coupled to the upper member 64.

The present disclosure may further include a speaker and a microphone 60. The speaker and microphone 60 are coupled to the head unit 51 and are electrically coupled to the circuit board. In such embodiments, the speaker and microphone 60 may also be switched on when the motion sensor 58 senses a motion.

In certain embodiments, the remote device 72 receives video signals from the home security pathway fixture 50 and also sends commands to the home security pathway fixture 50. In such embodiments, a software 74 may be loaded on the memory of the remote device 72. For example, an application may be loaded on a smart phone. Once the application is loaded on a smart phone, the home security pathway fixture 50 may be registered. The home security pathway fixture 50 is then connected to a wireless network 59 and the remote device 72 may wirelessly communicate with the home security pathway fixture 50 over the network 59. The remote device 72 may wirelessly communicate with the processor 57 of the home security pathway fixture 50 via the wireless communications interface 55 to turn on and off multiple features 76 of the home security pathway fixture 50. For example, the remote device 72 a button 88 to turn the motion sensor 58 on and off, a button 78 to turn a video steam on and off, a button 80 to turn on a two-way communication on and off, a button 82 to turn a cloud storage function on and off, a button 84 to turn the entire unit on and off, and a button 86 to turn an alarm function on and off. The buttons mentioned above may be a mechanical button or a digital button, such as a touch screen button. Additionally, the remote device 72 may be used to adjust the proximity range of the motion sensor 58. In certain embodiments, a plurality of home security pathway fixtures 50 may be paired and registered together such that the remote device 72 may control all of the home security pathway fixtures 50 at the same time.

When the motion sensor 58 is turned on and thereby activated, the camera 54 and the speaker and microphone 60 may be switched on when the motion sensor 58 senses a motion by a potential intruder within a proximity range of the motion sensor 58. At the same time, if the dusk and dawn sensor 61 does not detect light, the light emitter 54 turns on. An alert is sent to the remote device 72, indicating that the motion sensor 58 has sensed the motion. The video and sound signals are also sent to the remote device 72, such as a live feed of the camera 54 and a live feed of the speaker and microphone 60. In certain embodiments, the remote device 72 wirelessly communicates with the processor 57 via the wireless communications interface 55 to control an output of the speaker 60 for the two-way remote communication. A user initiates the button 80 on the remote device 72 and begins to speak. An audio signal is sent to the home security pathway fixture 50 via the wireless communications interface 55 and a live feed of the user's audio is projected by the speaker 60. For example, the user may remotely instruct the intruder to leave the property. Additionally, the user may press the button 86 to initiate a siren to play on the speaker 60 of the home security pathway fixture 50 to scare the intruder away. If the motion sensor 58 is turned off by the button 88, the present disclosure may be used as a standard pathway fixture 50, in which the light emitter 54 is turned on and off based on the motion sensor 58 and the dusk and dawn sensor 61 without wirelessly communicating with the remote computer 72.

The present disclosure includes the motion sensor and built-in light emitters, such as LEDs but also includes unique features that provide for a smart home security device that is installed and setup in minutes. This includes a night vision camera, motion sensor technology, 2-way audio communication with a built-in microphone, and remote monitoring from an application loaded on a smart device. The present disclosure is also unique because it acts as a stealth camera. A garden pathway is not the first place people expect a camera to be. It's easy to stake this item into the ground anywhere outside your home.

Figure 10A:
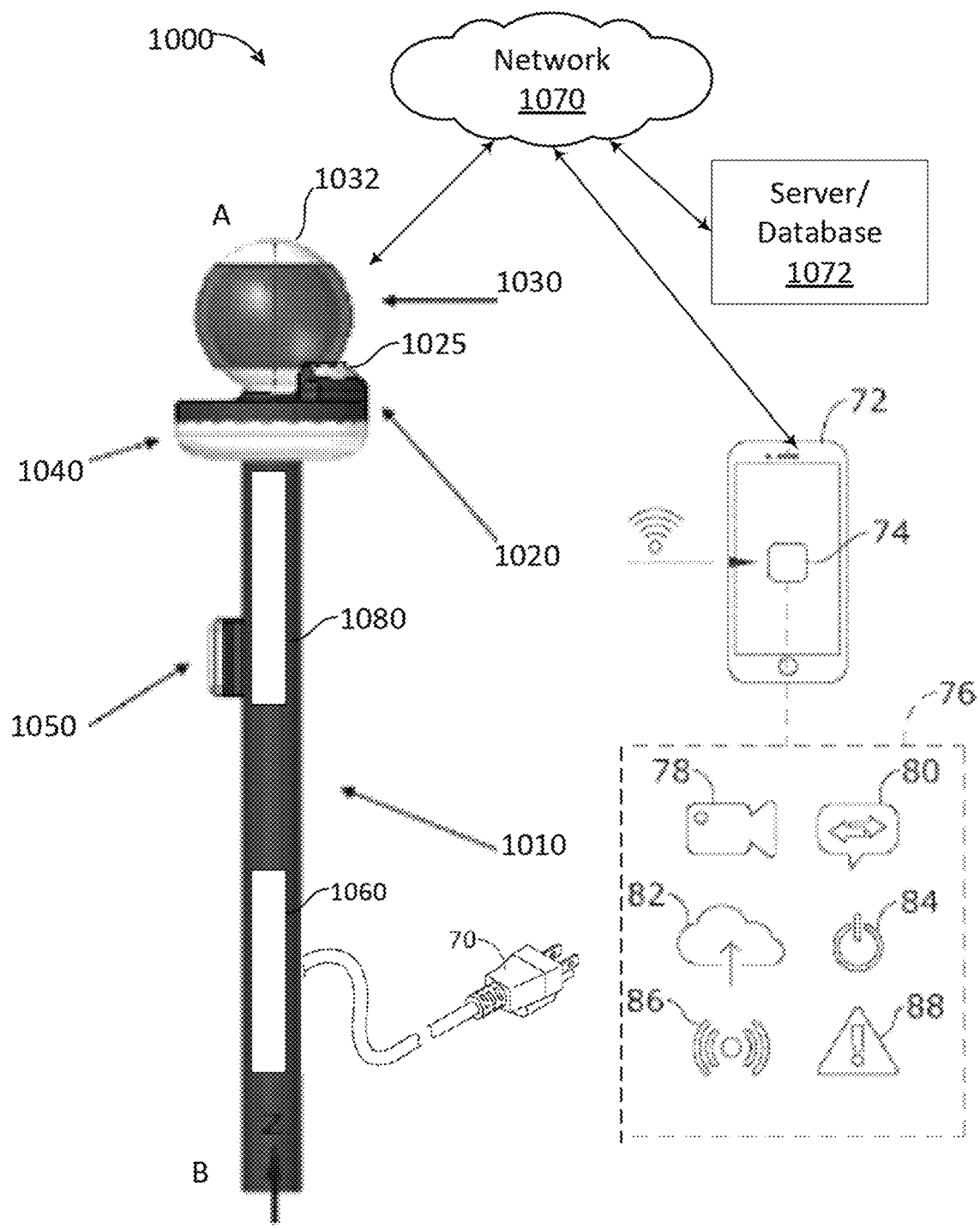
FIG. 10A is a system diagram of another embodiment of the present disclosure.
Figure 10F:
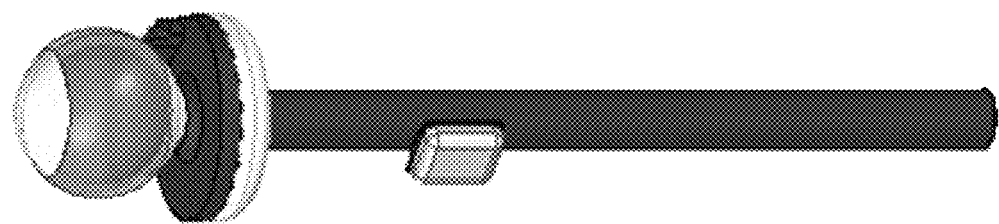
FIG. 10F is a perspective view of another embodiment of the present disclosure.
Figure 10E:
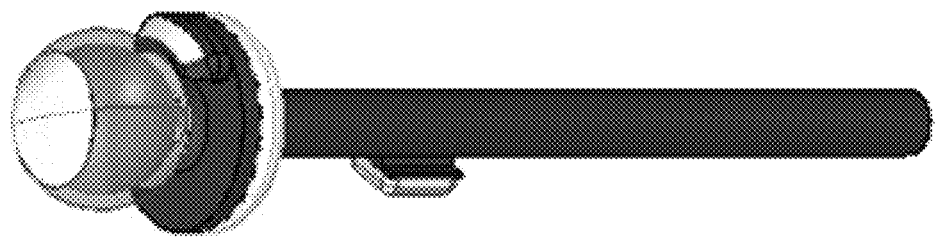
FIG. 10E is a perspective view of another embodiment of the present disclosure.
Figure 10D:
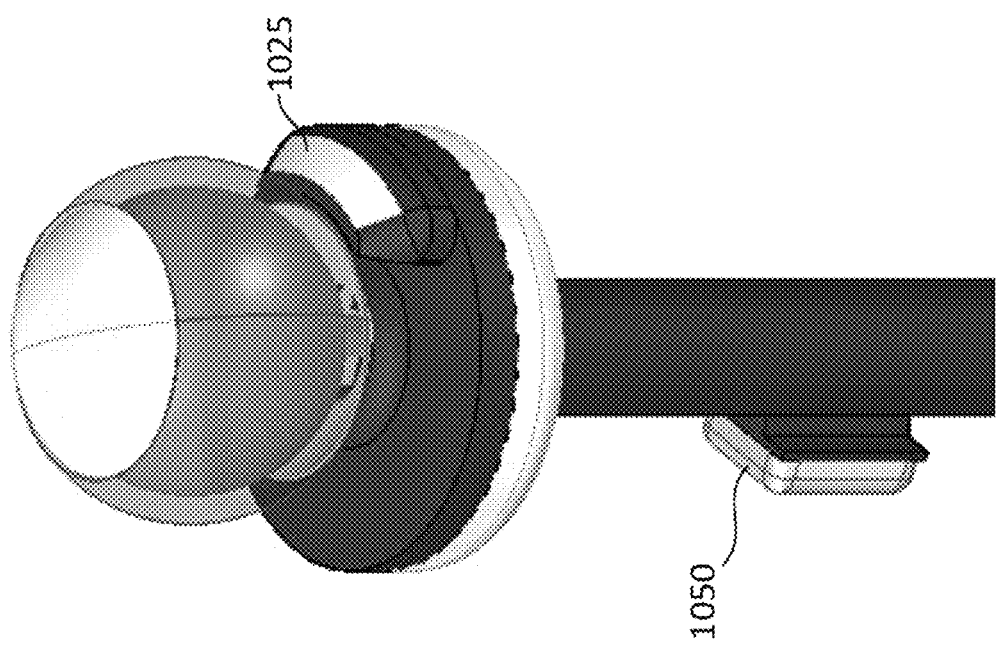
FIG. 10D is a perspective view of another embodiment of the present disclosure.

FIG. 10A is a system diagram of another embodiment of the present disclosure. In one aspect of the present disclosure, a home security pathway fixture 1000 may include: an elongated body 1010; a head unit 1030 at a top end A of the elongated body. A bottom end B of the elongated body may include a power source 1060. The head unit 1030 at the top end of the elongated body further includes: an integrated camera 1032 (e.g., a WiFi camera) electrically connected to the power source 1060. The power source 1060 may be a direct current (DC) power source such as a battery, or powered by an alternate current (AC) power source through hardwiring to conduits below the ground or through the power cord 70 connecting to AC power lines. The integrated camera 1032 is configured to capture an image and is configured to recognize an approaching object through executing a facial recognition algorithm according to features stored in a server/database 1072 either locally or remotely located through network 1070. In an example, the server/database 1072 may be a remote server/database such as a cloud computing with storage connected to the network 1070 which performs features mapping and comparison with the database. In another example, the features mapping may be performed locally by a server/database 1072 of a homeowner. In another embodiment, the integrated camera 1032 may contain basic memory to recognize basic facial features of the authorized people who are allowed to visit or enter the property.

The integrated camera 1032 may be integrated with a motion sensor which is coupled to the integrated camera 1032 and electrically connected to the power source, wherein the motion sensor may be configured to sense a motion of the approaching object. The integrated camera 1032 may be coupled to a facial recognition algorithm which may relay the geometric features of the facial features to a remote server/database 1072 for analysis or to be locally analyzed by a database stored within a memory chip of the integrated camera 1032. A plurality of light emitters 1020, 1040 may be coupled to the head unit 1030 and electrically connected to the power source for illumination of multi-toned lights and to illuminate with different intensities, wherein the light emitters 1020, 1040 may be activated by one or a combination of: the motion sensor and detected average ambient light being below a defined threshold. A wireless communications interface 1050 (e.g., Bluetooth or WiFi protocol) is electrically connected to the power source communicating to the network 1070. A processor 1080 may be electrically connected to the power source 1060, the integrated camera 1032, the motion sensor 1040, the light emitter 1020, and the wireless communications interface 1050, wherein the integrated camera 1032 may be activated when the motion sensor senses the motion of the approaching object, and the processor 1080 may send video signals captured by the integrated camera 1032 directly to a remote device 72 via the wireless communications interface 1050, that is after the server/database 1072 confirming that the recognized features of the approaching object is not on an approved list or is an unfriendly subject. That is, where the facial features of an individual observed by the camera 1032 are recognized as a set stored in the remote server/database 1072, the camera 1032 may "ignore" that individual and not initiate an alert, but where the features are not recognized, the camera 1032 may track that individual's movement and initiate an alert.

In implementation, the home security pathway fixture 1000 may include a dusk and dawn sensor 1025 integrated with the light emitter 1020. The dusk and dawn sensor 1025 detects light in the ambient environment. If the motion sensor detects motion and the dusk and dawn sensor 1025 detects light, the camera 1032 may only be activated and the light emitter 1020 may not be activated. If the motion sensor detects motion and the dusk and dawn sensor 1025 does not detect light, then both the camera 1032 and the light emitter 1020 are activated. The remote device 72 that communicates with the home security pathway fixture 1000 may be a laptop, desktop, or a smart device, such as a smart phone or a tablet with a computing system. The computing system is at least a processor and a memory. The computing system may execute on any suitable operating system such as IBM's zSeries/Operating System (z/OS), MS-DOS, PC-DOS, MAC-iOS, WINDOWS, UNIX, OpenVMS, ANDROID, an operating system based on LINUX, or any other appropriate operating system, including future operating systems.

In an example, the recognition of the facial features may include measuring geometric shapes based on distance relationships of locations of facial features including: eyes, nose, lips and jaw widths, etc. For an object such as a vehicle or equipment, the feature recognition may include measuring certain corners or apexes of an object to determine an image characteristic of the object stored in the database.

In an example, the recognizing of features of the approaching object stored in the server/database 1072 may include comparing at least a facial recognition on the approaching object and one or more of other features such as: object shape characteristics (e.g., a human, an animal, a vehicle or other objects), thermal or InfraRed (IR) imaging signatures (to differentiate human from animals and vehicles), electromagnetic or magnetic field interference (to determine object or material characteristics and presence of metallic objects), radio wave (RF) frequency absorption characteristics (range detection), and line of sight transmission and reception of an optical beam (movements of human, animal or objects).

After confirming that the approaching object is not on an approved list in the server/database 1072, a combination of actions may be taken in any sequences. In an example, the combination of actions may include two or more of: initiating an alert to the user's remote device 72, starting a two-way dialogue, providing verbal warnings, flashing high intensity light from the light emitters 1020, 1040 or from neighboring or remote light sources, transmitting high pitched sirens, and alerting a security monitoring agency or calling a local police station to summon for help.

After confirming that the approaching object is on an approved list in the server/database 1072, a signal may be returned to the remote device 72 to enable at least one of: unlocking of a door, a gate, a building, or a home to admit the approaching object who may be a resident of the home, a friend or a relative of the resident in the home, or a known and trusted visitor (e.g., a delivery-person). After confirming that the approaching object is on an approved list in the server/database 1072, a signal may be returned to the remote device 72 to be networked to the home to turn on the interior lights in the home.

FIGS. 10B-F are different perspective views of another embodiment of the present disclosure. In an example, the home security pathway fixture may further include a speaker and a microphone coupled to the housing and each electrically connected to the power source, wherein the microphone is switched on when the motion sensor senses a motion, wherein the processor sends audio signals to the remote device via the wireless communications interface 1050.

FIGS. 10G-H are exploded views showing respective assemblies of the head unit and the light emitters of another embodiment of the present disclosure. It is shown that the integrated camera 1032 may be configured to rotate or pan axially 360 degrees and may tilt radially over a range up to 90 degrees in elevation. One or both of the light emitters 1020 and 1040 may be of Light Emitting Diodes (LEDs) that emit multiple color tone lights when activated by high or low functions corresponding to motions.

The home security pathway fixture may be configured to be deployed independently, and operate independently, without the need of additional similar home security pathway fixtures to function. The home security pathway fixture may be configured to be deployed as a node with a plurality of similar home security pathway fixtures to form a security network in designated locations to relay signals and for continuous monitoring over an extended area.

Figure 11:
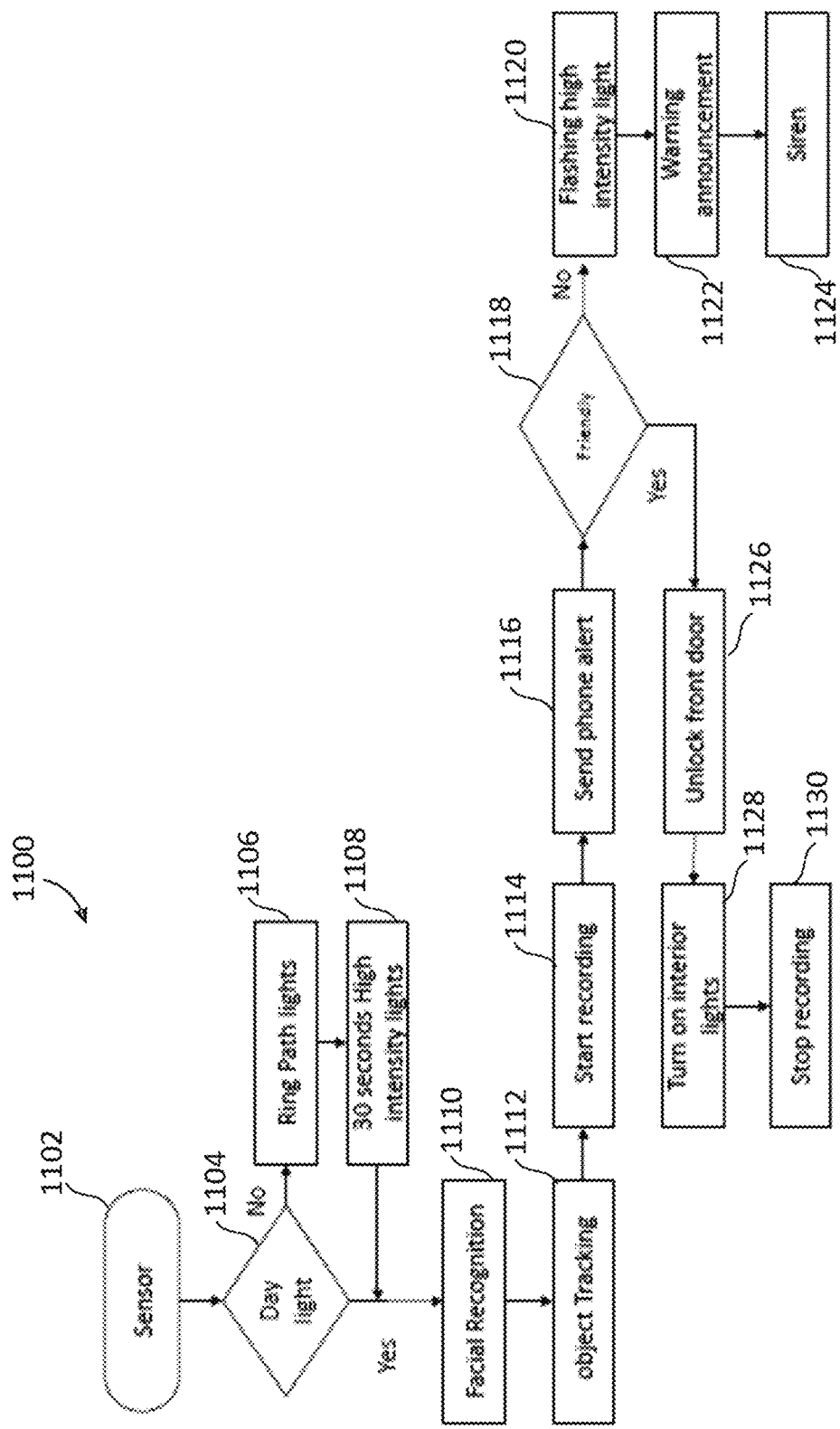
FIG. 11 is a flow chart of another embodiment of the present disclosure.

FIG. 11 is a flow chart of a method for monitoring a property using a security pathway fixture 1000. The sequence of steps may be interchanged and not to be limited.

In step 1102, a motion sensor that is coupled to the integrated camera 1032 on the head unit of the security pathway fixture may sense a motion of an approaching object. The approaching object may be a person, an animal or a vehicle.

In step 1104, upon detecting a motion, a plurality of light emitters 1020, 1040 may be activated to illuminate the approaching object, according to whether a detected average ambient light of the approaching object being below a defined threshold. In practice, the detection of average ambient light may be performed by a dawn or dusk light sensor which may be integrated in the light emitters 1020, 1040. If the average ambient light is below a threshold, a plurality of light emitters may be activated to illuminate the approaching object. For example, in step 1106, a ring path LED light 1040 may first be activated followed by activating a high intensity LED 1020 for a defined period of time (e.g., 30-60 seconds) in step 1108.

In step 1110, if during daylight or after the light emitters 1020, 1040 have been activated, the integrated camera 1032 may capture an image of the approaching object for facial recognition analysis by an algorithm which may be executed locally in the security pathway fixture 1000 or sent via a wireless interface 1050 to be analyzed remotely in a server/database 1072 (such as cloud computing) through network 1070 in step 1116 and 1118.

In steps 1112-1114, the approaching object may be tracked by the integrated camera 1032 for more images for facial features abstraction or real time video recording. In step 1118, the abstracted facial features may include measuring geometric shapes based on distance relationships of locations of facial features including: eyes, nose, lips and jaw widths, etc. For an object such as a vehicle or equipment, the feature recognition may include measuring certain corners or apexes of an object to determine an image characteristic of the object stored in the database. In an example, the recognizing of features of the approaching object stored in the server/database 1072 may include comparing at least a facial recognition on the approaching object and one or more of other features such as: object shape characteristics (e.g., a human, an animal, a vehicle or other objects), thermal or InfraRed (IR) imaging signatures (to differentiate human from animals and vehicles), electromagnetic or magnetic field interference (to determine object or material characteristics and presence of metallic objects), radio wave (RF) frequency absorption characteristics (range detection), and line of sight transmission and reception of an optical beam (movements of human, animal or objects).

After confirming that the approaching object is not on an approved list (not a friend or not a family member or resident of the home) in the server/database 1072, a combination of actions may be taken in any sequences in steps 1120 to 1124. For example, the combination of actions may include two or more of: starting a two-way dialogue, alerting a user of the system via the remote device 72, providing verbal warnings, flashing high intensity light from the light emitters 1020, 1040 or from neighboring or remote light sources, transmitting high pitched sirens, and alerting a security monitoring agency or calling a local police station to summon for help.

After confirming that the approaching object is on an approved list (a resident of the home, a family member, an expected visitor, etc.) in the server/database 1072, a signal may be returned to the remote device 72 to carry out steps 1126 to 1130, such as to enable at least one or both of: unlocking of a door of a gate, a building, or a home to admit the approaching object who may be a resident of the home, a friend or a relative of the resident in the home, or to turn on the interior lights in the home, recording by the integrated camera may be turned off.

It should be understood, of course, that the foregoing relates to exemplary embodiments of the disclosure and that modifications may be made without departing from the spirit and scope of the disclosure as set forth in the following claims and their equivalents.

What is claimed is:

1. A home security pathway fixture, comprising:
an elongated body;
a head unit at a top end of the elongated body;
a bottom end of the elongated body;
a power source;
wherein the head unit at the top end of the elongated body further comprising:
an integrated camera electrically connected to the power source, wherein the integrated camera is configured to capture an image and recognize an approaching object according to features stored in a server/database;
a motion sensor coupled to the integrated camera and electrically connected to the power source, the motion sensor configured to sense a motion of the approaching object;
a light emitter coupled to the head unit and electrically connected to the power source for illumination, wherein the light emitter is activated by one or a combination of: the motion sensor and detected average ambient light being below a defined threshold;
a wireless communications interface electrically connected to the power source; and
a processor electrically connected to the power source, the integrated camera, the motion sensor, the light emitter, and the wireless communications interface, wherein the integrated camera is activated when the motion sensor senses the motion of the approaching object, and the processor sends video signals captured in real time by the integrated camera directly to a remote device via the wireless communications interface, after the server/database confirming that the recognized features of the approaching object is not on an approved list.

2. The home security pathway fixture of claim 1, is being configured to be deployed as a node with a plurality of similar home security pathway fixtures to form a security network in designated locations to relay signals and for continuous monitoring over an extended area.

3. The home security pathway fixture of claim 1, wherein the average ambient light is detected by a dusk and dawn sensor.

4. The home security pathway fixture of claim 1, wherein the recognized features of the approaching object stored in the server/database comprising comparing at least a facial recognition and one or more of other features comprising: object shape characteristics, thermal or InfraRed (IR) imaging signatures, electromagnetic interference, radio wave (RF) frequency absorption characteristics, and line of sight transmission and reception of an optical beam.

5. The home security pathway fixture of claim 1, further comprising a speaker and a microphone coupled to the housing and each electrically connected to the power source, wherein the microphone is switched on when the motion sensor senses a motion, wherein the processor sends audio signals to the remote device via the wireless communications interface.

6. The home security pathway fixture of claim 1, wherein the integrated camera is configured to rotate axially 360 degrees and pan tilt radially over a range up to 90 degrees in elevation.

7. The home security pathway fixture of claim 1, wherein after confirming that the approaching object is not on an approved list, a combination of actions is being taken in any sequences, the combination of actions comprising two or more of: start a two-way dialogue, provide verbal warnings, flashes high intensity light from the light emitters or from neighboring light sources, transmits high pitched sirens and alerts a security monitoring agency or calls a local police station.

8. The home security pathway fixture of claim 1, wherein after confirming that the approaching object is on an approved list, a signal is returned to the remote device to enable at least one or both of: unlocking of a door or a gate of a home, and turning on of interior lights in the home.

9. The home security pathway fixture of claim 1, wherein the light emitter comprises corresponding Light Emitting Diodes (LEDs) that emit multiple color tone lights activated by high or low functions corresponding to motions.

10. The home security pathway fixture of claim 4, wherein the recognition of the facial features comprising measuring geometric shapes based on distance relationships of locations of facial features comprising: eyes, nose, lips and jaw widths.

11. A method for monitoring a property using a security pathway fixture, the method comprising performing, by at least one security pathway fixture having disposed at ground level along a pathway to a property, steps comprising:
    detecting, by a motion sensor that is coupled to an integrated camera on the head unit of the security pathway fixture, whether an approaching object should be alerted for security measures;
    activating, a light emitter to illuminate the approaching object, according to one or a combination of detected motion of the approaching object by the motion sensor and whether a detected average ambient light being below a defined threshold;
    capturing by the integrated camera, an image of the approaching object;
    determining according to captured images of the approaching object by an integrated camera mounted on a top end of a head unit of the security pathway fixture, wherein the integrated camera is configured to recognize the approaching object according to features stored in a server/database, wherein the determining comprising:
        using a facial recognition algorithm to abstract facial features of the approaching object, and comparing through a server/database locally or remotely, abstracted features of the approaching object on the captured image being on an approved list in the database, wherein the facial recognition algorithm being executed by a processor locally by the security pathway fixture or remotely by the server/database; and
    sending by a wireless communications interface, the captured image or a video in real time, the approaching object directly to a remote device via the wireless communications interface for subsequent security measures.

12. The method of claim 11, further comprising deploying the at least one security pathway fixture as a node with a plurality of similar home security pathway fixtures to form a security network in designated locations to relay signals and for continuous monitoring over an extended area.

13. The method of claim 11, wherein the average ambient light is detected by a dusk and dawn sensor.

14. The method of claim 11, wherein the recognizing of the features of the approaching object stored in the server/database comprising comparing at least a facial recognition and one or more of other features comprising: object shape characteristics, thermal or InfraRed (IR) imaging signatures, electromagnetic interference, radio wave (RF) frequency absorption characteristics, and line of sight transmission and reception of an optical beam.

15. The method of claim 11, switching on a microphone in the at least one security pathway fixture for a dialogue when applicable, when the motion sensor detects a motion, and sending audio signals to the remote device via the wireless communications interface.

16. The method of claim 11, wherein the integrated camera is configured to rotate axially 360 degrees and pan tilt radially over a range up to 90 degrees in elevation.

17. The method of claim 11, wherein after confirming that the approaching object is not on an approved list, a combination of actions is being taken in any sequences, the combination of actions comprising two or more of: starting a two-way dialogue, providing verbal warnings, flashing high intensity light from the light emitters or from neighboring light sources, transmitting high pitched sirens and alerting a security monitoring agency or calling a local police station.

18. The method of claim 11, wherein after confirming that the approaching object is on an approved list, a signal is being returned to the remote device to enable at least one or both of: unlocking of a front door or a gate of a home; and turning on of interior lights in the home.

19. The method of claim 11, wherein the light emitter comprises corresponding Light Emitting Diodes (LEDs) that emit multiple color tone lights activated by high or low functions corresponding to motions.

20. The method of claim 14, wherein the recognition of the facial features comprising measuring geometric shapes based on distance relationships of locations of facial features comprising: eyes, nose, lips and jaw widths.

* * * * *